3,010,929
EMULSION POLYMERIZATION OF VINYL ACETATE IN THE PRESENCE OF ADDITIVES
Wilford Donald Jones, Summit, N.J., assignor to Celanese Corporation of America, New York, N.Y., a corporation of Delaware
No Drawing. Filed Oct. 20, 1954, Ser. No. 463,600
23 Claims. (Cl. 260—29.6)

This invention relates to the polymerization of vinyl acetate and relates more particularly to the production of aqueous emulsions of polyvinyl acetate.

It is an object of this invention to provide a novel aqueous emulsion of polyvinyl acetate, and a novel process for the preparation of such emulsions.

Another object of this invention is the provision of a new aqueous emulsion of polyvinyl acetate of fine particle size that may be mixed with relatively large amounts of pigments to produce a stable paint.

A further object of this invention is to provide an aqueous emulsion of polyvinyl acetate that may be mixed with pigments to provide paint films of improved scrub-resistance.

Other objects of this invention will be apparent from the following detailed description and claims.

In accordance with one aspect of this invention, aqueous emulsions of vinyl acetate polymers are produced by the polymerization of vinyl acetate in aqueous emulsion in the presence of decahydronaphthalene. Advantageously a small amount of the decahydronapthalene is added to the monomeric vinyl acetate and the resulting mixture is polymerized by adding it gradually to an aqueous medium containing a dispersing agent, while said aqueous medium is maintained at an elevated temperature, a polymerization catalyst being present during the polymerization reaction. However, the decahydronaphthalene may be added separately to the aqueous medium, before or during the polymerization reaction, if desired. Suitable proportions of decahydronaphthalene are about 0.2 to 10%, preferably 0.5 to 4%, based on the weight of the vinyl acetate.

According to another aspect of this invention emulsions of vinyl acetate polymers are prepared by polymerization in the presence of a small amount, e.g. 0.01% to 0.1%, of a chelating and sequestering agent containing amine and carboxylic acid groups, such as for example, iminotriacetic acid or its alkali metal salts or ethylene diamine tetraacetic acid or its alkali metal salts. Especially good results have been obtained by the use of the trisodium salt of ethylene diamine tetraacetic acid. It is found that when these agents are added the reaction proceeds in such a manner that the content of residual monomer in the polymerized product is lower than when such agents are absent, all other conditions being the same. This effect is particularly marked when commercial vinyl acetate containing a minor amount of a polymerization inhibitor, such as hydroquinone, is employed. The chelating and sequestering agents used in the practice of this invention are stable indefinitely in the polymer emulsion or paint, undergoing no reversion, hydrolysis or decomposition. They are not colloidal, do not precipitate proteins which may be present in the emulsion, are compatible with cationic agents which may be added, do not thin out clays or starches and exert a dispersing action on titanium dioxide and other inorganic materials such as manganese dioxide.

In one preferred form of this invention the monomeric vinyl acetate is added to the aqueous medium containing the dispersing agent at such a rate that throughout substantially the whole of the polymerization reaction the concentration of monomer is relatively low, i.e., not over about 25 parts of monomer, preferably not above 5 parts of monomer, for each 100 parts of water. Advantageously, the monomer is added at a rate substantially equal to the rate of polymerization thereof in said aqueous medium. The monomer is added until the concentration of polyvinyl acetate in the aqueous medium has increased to the desired value, preferably until the polyvinyl acetate content of the resulting emulsion is about 50 to 60%.

The polymerization reaction is conveniently carried out in the presence of a catalyst, preferably a peroxide catalyst. Examples of suitable peroxide catalysts are potassium persulfate, ammonium persulfate, hydrogen peroxide, and such combinations as mixtures of hydrogen peroxide and an iron salt; hydrogen peroxide and zinc formaldehyde sulfoxylate or other similar reducing agent; hydrogen peroxide and a titanous salt; potassium persulfate and sodium bisulfite; a bromate mixed with a bisulfite; and other redox catalyst systems. In general an amount of peroxide catalyst sufficient to supply 0.001 to 0.1 part of available oxygen per 100 parts of monomer is suitable.

The dispersing agent employed in the practice of this invention is preferably a mixture of 1 to 10 parts of a hydrophilic colloid and 0.01 to 2 parts of a surface tension depressant per 100 parts of water. Examples of suitable hydrophilic colloids are water-soluble polyvinyl alcohols, including substantially fully hydrolyzed and partially hydrolyzed polyvinyl acetates, gum arabic, hydroxyethyl cellulose, methyl cellulose, carboxymethyl cellulose, soluble starch, glue, gelatine, sodium alginate and agar. Examples of suitable surface tension depressants are the known anionic, cationic and non-ionic wetting agents. Among the anionic agents which may be used are the higher molecular weight sulfonic acids and salts thereof, e.g. alkyl aryl sulfonates such as isobutyl, diisobutyl or keryl naphthalene sulfonic acids or their sodium salts, sodium lauryl sulfate, sodium salt or dioctyl sulfosuccinate, and formaldehyde-naphthalene sulfonic acid condensation products. Examples of suitable non-ionic surface tension depressants are the polyglycol ethers, esters and amides obtained by the reaction of ethylene oxide or higher polyethylene glycols with higher fatty acids, alcohols or amides. A mixture of a hydrophilic colloid and a cyclic alcohol, e.g. a sterol such as cholesterol, is also suitable as the dispersing agent.

The polymerization of the vinyl acetate is advantageously carried out at a pH of about 3 to 8, preferably 4 to 7. The pH may be controlled by the use of mild acids or bases, such as formic acid, sodium bicarbonate, sodium acetate, sodium phosphate, or mixtures thereof.

The temperature of polymerization may be varied considerably. Temperatures of about 50 to 95° C. are preferred. The polymerization reaction may be carried out under atmospheric, subatmospheric or superatmospheric pressure. Conveniently, the reaction is carried out in a substantially oxygen-free atmosphere by operating in a closed reactor equipped with a reflux condenser, which prevents the vinyl acetate monomer, the most volatile constituent of the reaction mixture, from leaving the reactor and serves to maintain an atmosphere of vinyl acetate vapor above the liquid aqueous reaction medium. The reaction may be carried out in an atmosphere of an inert gas, e.g. by passing a stream of nitrogen or carbon dioxide through the reaction mixture.

The process of this invention finds its greatest utility in the manufacture of homopolymers of vinyl acetate. However, it may also be employed for the copolymerization of mixtures of vinyl acetate and minor amounts of other ethylenically unsaturated copolymerizable monomers such as the alkyl acrylates and methacrylates, e.g. methyl acrylate or methyl methacrylate; other vinyl esters such as vinyl butyrate or vinyl chloride; crotonic esters, e.g. ethyl crotonate; dialkyl maleates such as dimethyl maleate; acrylic, methacrylic or crotonic acids; acrylamide and N-alkyl or N,N-dialkyl acrylamides; methyl vinyl sulfone; vinyl benzene sulfonic acid or salts thereof; vinyl benzene sulfonamide; sodium or other salt of vinyl-sulfonic acid; esters of vinyl-sulfonic acid such as the ethyl ester; nitriles such as acrylonitrile or fumaronitrile; maleic anhydride; N-vinyl pyrrolidone; and similar compounds.

The polyvinyl acetate emulsions produced in accordance with this invention are generally of fine particle size, i.e. the polymer particles therein have diameters of 2 microns or less, e.g. 0.3 to 1.2 microns. They may be mixed with plasticizers and pigments to produce paints of excellent properties. Comparisons between paints made with the known polyvinyl acetate emulsions and paints made with the decahydronaphthalene-containing polyvinyl acetate emulsions of this invention show that the emulsions of this invention tolerate larger volumes of pigment and that paints made with the emulsions of this invention are less sensitive to mechanical agitation and are much more resistant to scrubbing.

Examples of pigments which may be employed for producing paints in accordance with this invention are titanium dioxide such as that known as "Titanox RA–50"; lithopone such as that known as "Albalith 14"; antimony oxide; barytes; diatomaceous silica, e.g. "Celite 281"; talc such as "Nytal 300"; clay such as that sold under the name "ASP 400"; mica, for example 325 mesh waterground mica; red, yellow, black and brown iron oxides, e.g. "Irox Red 1380" and "Mapico Brown"; maroon oxides; metallic browns; cadmium red; toluidine red; para red; lithol toner; cadmium yellow; hansa yellow; benzidine yellow; dinitraniline orange; chromium oxide green; phthalocyanine green; phthalocyanine blue; lampblack; carbon black; mineral black; metallic flakes and powders (e.g. aluminum, copper); and luminous pigments.

The amount of pigment used may be varied widely, a suitable range being, for example, an amount sufficient to provide a "pigment volume concentration" of about 30 to 45%. Pigment volume concentration (abbreviated "P.V.C.") is defined in the art as the volume of pigment divided by the sum of the volume of pigment and the volume of non-volatile vehicle in the paint. The P.V.C. may be varied depending on the type of pigment, degree of hiding desired and degree of flatness desired. The high tolerance for pigments of the polyvinyl acetate emulsions made in the presence of decahydronaphthalene in accordance with this invention makes it possible to use the cheaper extender types of pigments while still obtaining a paint of good hiding power and scrub resistance.

Examples of plasticizers which may be used in the manufacture of the paint are monomeric ester plasticizers such as dibutylphthalate, or alkyd resin type polyesters, e.g. "Paraplex G25," "Paraplex G40," "Paraplex G60," or "Resoflex R-296"; chlorinated diphenyls such as that sold under the name "Aroclor 1242," and extender type plasticizers such as the substituted biphenyls sold by Monsanto Chemical Company under the names "HB40" and "HB20."

The amount of plasticizer it is preferred to use varies depending on the particular plasticizer chosen. Thus, for such plasticizers as dibutyl phthalate, dioctyl phthalate and tricresyl phosphate the preferred proportion is about 10 to 15% based on the weight of polyvinyl acetate, while for dioctyl sebacate or dioctyl adipate it is about 8 to 10% and for the alkyd resinous type of plasticizer it is about 12 to 20%. Smaller proportions, or no plasticizer at all, should be employed with those copolymers of vinyl acetate which are internally plasticized by the presence of the copolymerized ethylenically unsaturated compound.

The following examples are given to illustrate the invention further.

*Example I*

0.96 part by weight of the polyvinyl alcohol known as "Elvanol 51–05," 0.64 part by weight of the lower molecular weight polyvinyl alcohol known as "Elvanol 50–42" (both "Elvanols" being hydrolyzed polyvinyl acetates whose extent of hydrolysis is 86 to 89%), 0.15 part by weight of "Aerosol OT" (sodium salt of dioctyl sulfosuccinate), 0.05 part by weight of potassium persulfate, 0.033 part by weight of sodium bicarbonate and 0.025 part by weight of "Sequestrene NA3" (the trisodium salt of ethylene diamine tetraacetic acid) are mixed with 44.1 parts of water to form a solution. 53 parts by weight of vinyl acetate are mixed with 1 part by weight of decahydronaphthalene and 5.4 parts by weight of the resulting mixture are added to the aforementioned aqueous solution, which is at a temperature of 60° C., in a reactor fitted with a stirrer and a reflux condenser. An exothermic polymerization reaction takes place after a short induction period. The temperature of the resulting aqueous mixture is raised while refluxing takes place and reaches 79.5° C. after 21 minutes. The remainder of the mixture of vinyl acetate and decahydronaphthalene is then added dropwise with adequate stirring to the aqueous mixture over a period of 119 minutes, while the temperature of the aqueous mixture is maintained at 78–81° C., and thereafter the whole is heated to 90° C. for 60 minutes to complete substantially the polymerization of the monomer.

The resulting emulsion has a North fineness of 8, a viscosity (Brookfield, 20 r.p.m.) of 6280 centipoises, and a pH of 4.8. It is stable to freezing, withstanding more than five freeze-thaw cycles, and has a particle size of about 0.3 to 1.2 microns.

*Example II*

The polyvinyl acetate emulsion produced in Example I is mixed with an aqueous plasticizer emulsion containing dibutyl phthalate, the amount of the plasticizer emulsion being sufficient to provide 15 parts of dibutyl phthalate per 100 parts of the "solids" (i.e. non-volatile materials) present in the polyvinyl acetate emulsion. The resulting mixture is formed into a film which is tested for scrub resistance. The film withstands 1400 scrub cycles before it fails. When the same test is applied to an emulsion made in an otherwise identical manner, but without the decahydronaphthalene, the film withstands only 225 scrub cycles before it fails.

In this example the aqueous plasticizer emulsion contains by weight, 50% of dibutyl phthalate, 2½% of the emulsifying agent known as "Triton X100," 1% of concentrated aqueous ammonia and the balance water. The mixture of the polyvinyl acetate emulsion and the plasticizer emulsion is laid down in the form of a film 0.006 inch thick on a ground glass plate and then aged 48 hours, after which the coated plate is placed in Gardner washability machine (Model 105) where the surface of the coating is thoroughly wetted with a 1% aqueous solution of the detergent known as "Dreft" and a uniformly weighted bristle brush is passed back and forth over the film. The number of complete cycles of brushing is counted.

*Example III*

A pigment dispersion is prepared by ball milling for 18 hours the following materials: 1397.5 parts by weight of deionized water, 12.1 parts by weight of "Daxad 11" (a sodium salt of a condensed alkyl aryl sulfonate), 6.0 parts by weight of "Tergitol NPX" (a dispersing agent comprising a non-ionic mixture of homologous alkyl aryl polyglycol ethers), 2345 parts by weight of "Titanox RA" (a titanium dioxide pigment), 33.2 parts by weight of the blue pigment known as "Monastrol Blue LD," and 249 parts by weight of the English mica of 325 mesh particle size known as "WG" mica. To form a paint, this pigment dispersion is mixed thoroughly with the aqueous plasticizer emulsion described in Example II, and with the polyvinyl acetate emulsion described in Example I, the amounts of the ingredients being such that P.V.C. of the resulting paint is 40% and 15 parts of dibutyl phthalate are present per 100 parts of the solids contained in the polyvinyl acetate emulsion.

When tested for scrub-resistance in the manner described in Example II, a film of this paint withstands 2000 scrub cycles, the test being discontinued at this point. A film of paint made in an otherwise identical manner, except that no decahydronaphthalene is present during the polymerization, withstands only 1283 scrub cycles.

*Example IV*

Example III is repeated except that a larger amount of pigment dispersion is used so that the P.V.C. of the resulting paint is 45%. The paint is stable. In contrast, when it is attempted to prepare the paint in an otherwise identical manner, except that no decahydronaphthalene is present during the polymerization, the resulting composition coagulates, showing that the polyvinyl acetate emulsion does not tolerate such a high content of pigment.

*Example V*

An aqueous solution is prepared by dissolving in 44.1 parts by weight of water, 0.49 part by weight of "Elvanol 50–42," 0.96 part by weight of "Elvanol 51–05," 0.15 part by weight of "Aerosol OT," 0.10 part by weight of potassium persulfate, 0.032 part by weight of sodium bicarbonate and 0.025 part by weight of "Sequestrene NA3." 50 parts of commercial vinyl acetate (containing 15 parts per million of hydroquinone) are mixed with 1 part of decahydronaphthalene, and 5.0 parts of this mixture are added to the aforesaid aqueous solution in a stainless steel (Type 304) reactor at a temperature of 55° C. The resulting blend is stirred and heated at reflux temperature for 40 minutes at which time the temperature of the refluxing mixture has risen to 80° C. The remainder of the vinyl acetate-decahydronaphthalene mixture is added dropwise with stirring, together with small additional amounts of water, over a period of 156 minutes, the temperature of the reacting mixture during this period being 72 to 83° C. The temperature is then raised to 94° and held at this level for 75 minutes. The resulting emulsion has a viscosity of 250 centipoises, an unreacted monomer content of 1.0%, a solids content of 47.8% and a pH of 3.7.

*Example VI*

Example II is repeated except that the polyvinyl acetate emulsion of Example I is replaced by the polyvinyl acetate emulsion of Example V. After 2000 scrub cycles the film shows no sign of deterioration and the scrub test is discontinued.

*Example VII*

Example IV is repeated except that the polyvinyl acetate emulsion of Example I is replaced by the polyvinyl acetate emulsion of Example V. After 2000 scrub cycles the paint film is intact and the scrub test is discontinued.

*Example VIII*

Example I is repeated except that p-xylene is used in place of decahydronaphthalene and the amount of potassium persulfate is increased to 0.10 part by weight because of the slow rate at which the polymerization reaction proceeds with 0.05 part by weight of potassium persulfate in the presence of the p-xylene. The rate of reaction is considerably slower than when decahydronaphthalene is used, consuming a total of 315 minutes. The resulting polymerized mixture coagulates on cooling.

*Example IX*

An aqueous solution is prepared from 43.3 parts by weight of water, 2.5 parts by weight of "Cellosize WP3" (hydroxyethyl cellulose having a viscosity, in 5% aqueous solution, of 250 to 350 centipoises), 0.15 parts by weight of the alkyl aryl sulfonate known as "Santomerse D," 0.025 parts by weight of sodium bicarbonate, 0.025 part by weight of "Sequestrene NA3" and 0.05 part by weight of potassium persulfate. 53 parts by weight of vinyl acetate and 1 part of decahydronaphthalene are mixed and of this mixture 5.4 parts by weight are added to the aforesaid aqueous solution. The resulting reaction mixture is heated under reflux for 23 minutes at which time the temperature of the refluxing mixture is 77° C. The remainder of the vinyl acetate-decahydronaphthalene mixture is added gradually over a period of 122 minutes while the temperature of the reaction mixture is 77 to 82° C. The mixture is then heated to 90° C. After a total reaction period of 206 minutes, the emulsion is cooled. It contains 54.4% solids, has a viscosity of 10,940 centipoises and a North fineness of 5. When tested as in Examples II and III, except that in the latter case the P.V.C. is 35%, films made from this emulsion are intact after 2000 scrub cycles.

It is to be understood that the foregoing detailed description is merely given by way of illustration and that many variations may be made therein without departing from the spirit of my invention.

In this specification all proportions are by weight unless otherwise indicated.

Having described my invention, what I desire to secure by Letter Patent is:

1. Process for the production of polymer emulsions, which comprises polymerizing vinyl acetate in aqueous emulsion containing decahydronaphthalene.

2. Process for the production of polymer emulsions, which comprises emulsifying in aqueous medium a mixture of vinyl acetate and decahydronaphthalene and polymerizing said vinyl acetate in the resulting emulsion, the proportion of decahydronaphthalene being about 0.2 to 10%, based on the weight of vinyl acetate.

3. Process for the production of polymer emulsions, which comprises adding a mixture of vinyl acetate and decahydronaphthalene to an aqueous medium containing a dispersing agent for said mixture and polymerizing said vinyl acetate in emulsion in said aqueous medium during said addition and in the presence of a peroxidic polymerization catalyst.

4. Process for the production of polymer emulsions, which comprises adding a mixture of vinyl acetate and decahydronaphthalene to an aqueous medium containing a dispersing agent for said mixture and polymerizing said vinyl acetate in emulsion in said aqueous medium during said addition and in the presence of a peroxidic polymerization catalyst, said addition being carried out at such a rate that the concentration of monomeric vinyl acetate in the aqueous medium does not exceed 25 parts per 100 parts of water, the proportion of decahydronaphthalene being 0.2 to 10%, based on the weight of the vinyl acetate.

5. Process as set forth in claim 4 in which the dispersing agent is a mixture of a hydrophilic colloid and a surface tension depressant and in which there is present during the polymerization a minor amount of the trisodium salt of ethylene diamine tetraacetic acid.

6. Process as set forth in claim 4 in which the dispersing agent is a mixture of 1 to 10 parts of a hydrophilic colloid and 0.01 to 2 parts of a surface tension depressant, per 100 parts of water, and the peroxidic polymerization catalyst is present in an amount sufficient to supply 0.001 to 0.1 part of available oxygen per 100 parts of water.

7. Process as set forth in claim 6 in which the hydrophilic colloid is polyvinyl alcohol and the surface tension depressant is a compound containing a sulfonate group and a long aliphatic chain and in which the temperature of polymerization is 50 to 95° C.

8. An aqueous emulsion of polymerized vinyl acetate produced in accordance with the process of claim 1.

9. An aqueous emulsion of polymerized vinyl acetate produced in accordance with the process of claim 6.

10. A paint comprising the emulsion of claim 9 and a pigment.

11. An article coated with a dried film of the paint of claim 10.

12. An aqueous emulsion of polymerized vinyl acetate produced in accordance with the process of claim 7, the average particle size of the polymer particles in said emulsion being not over about 2 microns.

13. A paint comprising the emulsion of claim 12, a pigment and a plasticizer.

14. An article coated with a dried film of the paint of claim 13.

15. Process for the production of paints which comprises polymerizing vinyl acetate in aqueous emulsion containing decahydronaphthalene and mixing the resulting emulsion with a pigment to form a paint.

16. Process for the production of emulsions which comprises polymerizing vinyl acetate in aqueous emulsion in the presence of a peroxidic polymerization catalyst and containing a small amount of a chelating and sequestering agent of the group consisting of iminotriacetic acid, ethylene diamine tetraacetic acid and their respective alkali metal salts, the polymerization taking place at a temperature of at least about 50° C.

17. Process as set forth in claim 16 in which polymerization takes place at a pH between about 3 and about 8.

18. Process as set forth in claim 16 in which the chelating and sequestering agent is present in an amount between 0.01 and 0.1 weight percent, based on the weight of vinyl acetate.

19. Process as set forth in claim 17 in which polymerization takes place at a temperature between about 50° and about 95° C.

20. Process as set forth in claim 17 in which the chelating and sequestering agent is an alkali metal salt of ethylene diamine tetraacetic acid.

21. Process as set forth in claim 20 in which the chelating and sequestering agent is the trisodium salt of ethylene diamine tetraacetic acid.

22. In a process for the production of polymer emulsions wherein vinyl acetate, as at least the major monomeric reactant, is emulsified in an aqueous medium and polymerized therein and wherein any other reactant monomer is ethylenically unsaturated, the improvement which comprises emulsifying decahydronaphthalene with said vinyl acetate.

23. The process of claim 1 wherein said polymerization takes place in the presence of a peroxidic polymerization catalyst at a temperature from about 50 to about 95° C. and at a pH between about 3 and about 8.

References Cited in the file of this patent

UNITED STATES PATENTS

| | | |
|---|---|---|
| 2,471,959 | Hunt | May 31, 1949 |
| 2,536,470 | Schoenholz et al. | Jan. 2, 1951 |
| 2,560,741 | Provost | July 17, 1951 |
| 2,584,773 | Reynolds et al. | Feb. 5, 1952 |
| 2,614,087 | Turnbull | Oct. 14, 1952 |
| 2,629,708 | Uraneck et al. | Feb. 24, 1953 |
| 2,662,866 | Bristol et al. | Dec. 15, 1953 |
| 2,697,700 | Uraneck | Dec. 21, 1954 |
| 2,763,578 | Simons | Sept. 18, 1956 |

OTHER REFERENCES

Tapp: "Chemistry in Canada," April 1950, volume 2, No. 4, pages 21–24.

Gregg et al.: "Faraday Society Discussions," No. 2 (1947) pages 328–337, especially page 336.